United States Patent [19]

Pfeffer, Sr. et al.

[11] Patent Number: 4,635,393
[45] Date of Patent: Jan. 13, 1987

[54] ELECTRIC INSECT KILLER

[76] Inventors: Harry L. Pfeffer, Sr., Rte. 2 Box 170, Caldwell, Tex. 77836; Harry L. Pfeffer, Jr., Box 584, Bryon, Tex. 77805

[21] Appl. No.: 744,941

[22] Filed: Jun. 17, 1985

[51] Int. Cl.$^4$ .............................................. A01M 1/22
[52] U.S. Cl. ...................................................... 43/112
[58] Field of Search ............... 43/98, 112, 124, 132.1; 47/1.3; 256/10; 119/29

[56] References Cited

U.S. PATENT DOCUMENTS

| | | | |
|---|---|---|---|
| 2,558,080 | 6/1951 | Gardenhour | 43/112 |
| 2,607,164 | 8/1952 | Fenton | 47/1.3 |
| 2,906,056 | 9/1959 | Youngblood | 43/124 |
| 3,792,547 | 2/1974 | Day | 43/98 |

FOREIGN PATENT DOCUMENTS

| | | | |
|---|---|---|---|
| 1016812 | 11/1952 | France | 43/112 |
| 282653 | 8/1952 | Switzerland | 43/98 |
| 443773 | 2/1968 | Switzerland | 43/112 |
| 2095966 | 10/1982 | United Kingdom | 43/132.1 |

Primary Examiner—Nicholas P. Godici
Assistant Examiner—G. M. Reid
Attorney, Agent, or Firm—Lalos, Keegan & Kaye

[57] ABSTRACT

The disclosure relates to a device for killing ants and other insects by electrocution. The device includes an elongated shaft or probe for insertion into the anthill and an adapter for connecting the device to an electrical source. A charge ring is spaced from a charge plate between which ants can pass. When ants attack the device having been inserted into the anthill, those that find themselves between the charge plate and the charge ring will short circuit the device causing the ants to be electrocuted.

11 Claims, 2 Drawing Figures

4,635,393

ELECTRIC INSECT KILLER

BACKGROUND OF THE INVENTION

A problem which is confronted by farmers and those who raise livestock is the attack of livestock by ants or other insects. When this is done in sufficient numbers, the ants can actually kill the livestock. The invention relates to a device for electrocuting these insects, particularly ants by utilizing sources other than a typical 120 Volt electrical source. The land or grazing area for livestock is often confined by an electrified fence to keep the livestock within the owners property. The invention relates to a device which utilizes the electrified fence as a source of electric current for eradicating insects.

Electrocuting devices have been used before to destroy insects on grazing land but these have suffered from many deficiencies. Some have required transformers, because they are ultimately attached to high voltage sources. Even when this has been done, the voltage has been such that various protectors are needed to insure that other larger animals are not electrocuted when the device is energized to kill insects in the vicinity. Furthermore, some devices do not have any type of apparatus for fixing the device in place adjacent to a ground to effect insect movement, among other things. Other devices do not have large areas on which the insects can move and facilitate attraction to the vicinity where they will be electrocuted. In addition, a number of these devices have been relatively complex in configuration increasing their cost where they are rendered uneconomical for use in large numbers over a large area of fenced grazing land.

Applicant's invention has overcome many of these problems. The apparatus of the invention has a configuration which is relatively simple and therefore can be produced in economic quantities. It involves the use of electric fences as a source and therefore does not produce electric currents which can be detrimental to humans and other large animals. A feature of the invention is that the insects are actually drawn to the device when a probe is inserted into an anthill, for example. This enhances the ability to destroy a large number of insects in a relatively short period of time.

The device of the invention, more specifically includes a relatively large plate with a circular rod fixed in spaced relationship above the plate. The plate is secured to ground while the rod is fixed to the electrical source such that when the ant or other insect passes between these two they will be electrocuted. A probe extends from the bottom of the plate for insertion into an anthill. The electrical connector connecting the circular rod to the source includes an electrically conductive spring loaded clip for attachment to an electric fence. The plate is specifically configured to permit access by a large number of insects to the vicinity of the rod so that they may be electrocuted. The invention takes advantage of a known characteristic of ants in particular. When the probe is placed into the anthill, the ants will attack the probe and the remainder of the device as it would any alien object. In doing so, a number of the ants will pass between the electrically charged rod and the plate attached to ground. When this is done, the ants will be electrocuted by creating a short circuit. When these ants are killed, other ants will come to their rescue, and they will be electrocuted in a similar manner. This activity will continue until substantially all the ants are killed.

These features are just some of the features of the invention. Other features will become apparent from the detailed description of the preferred embodiment which follows.

DETAILED DESCRIPTION OF THE PREFERRED EMBODIMENT

Figure 1:
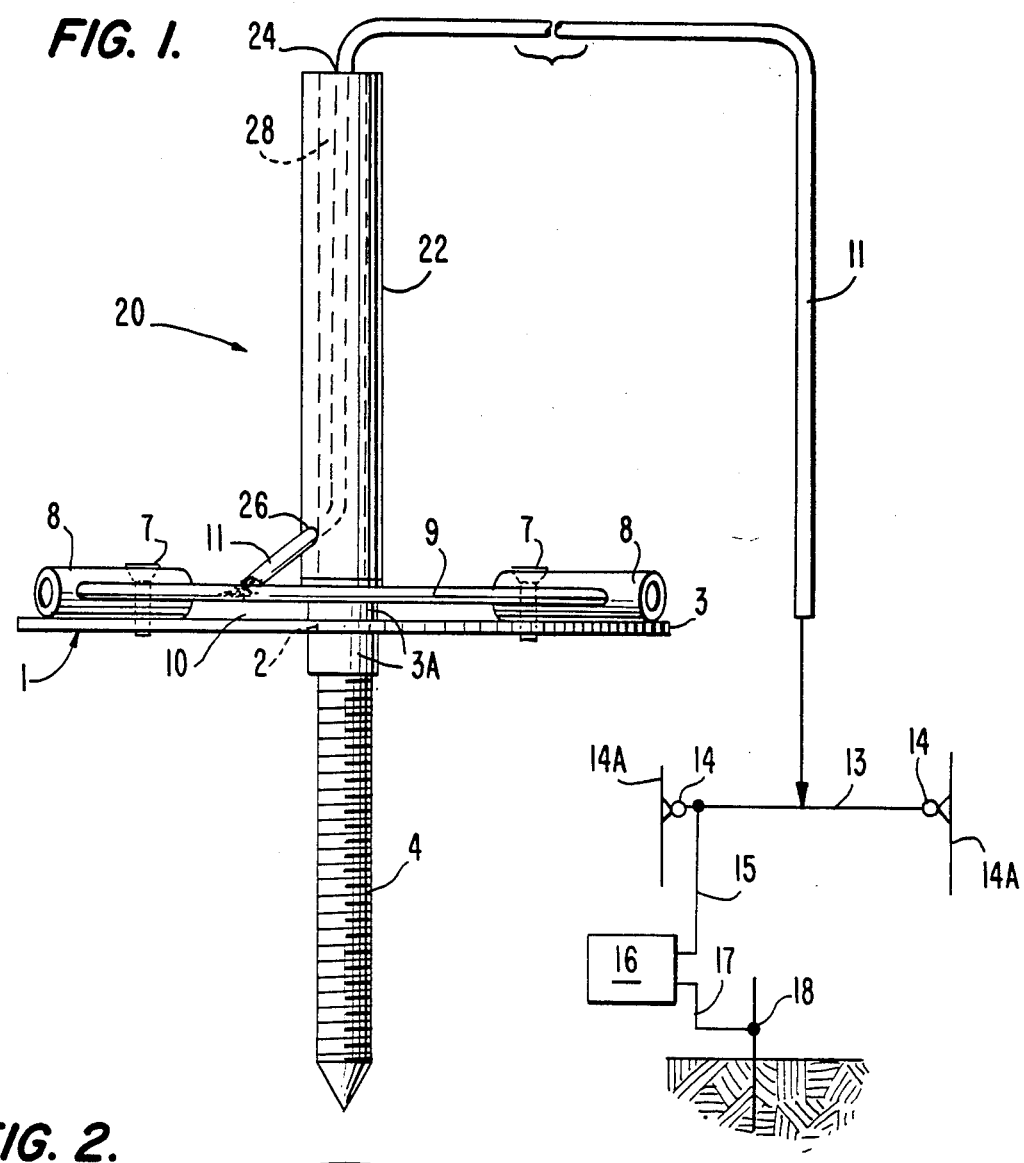
FIG. 1 is an elevation view of the invention with a portion of the fence to which it is attached shown in schematic.
Figure 2:
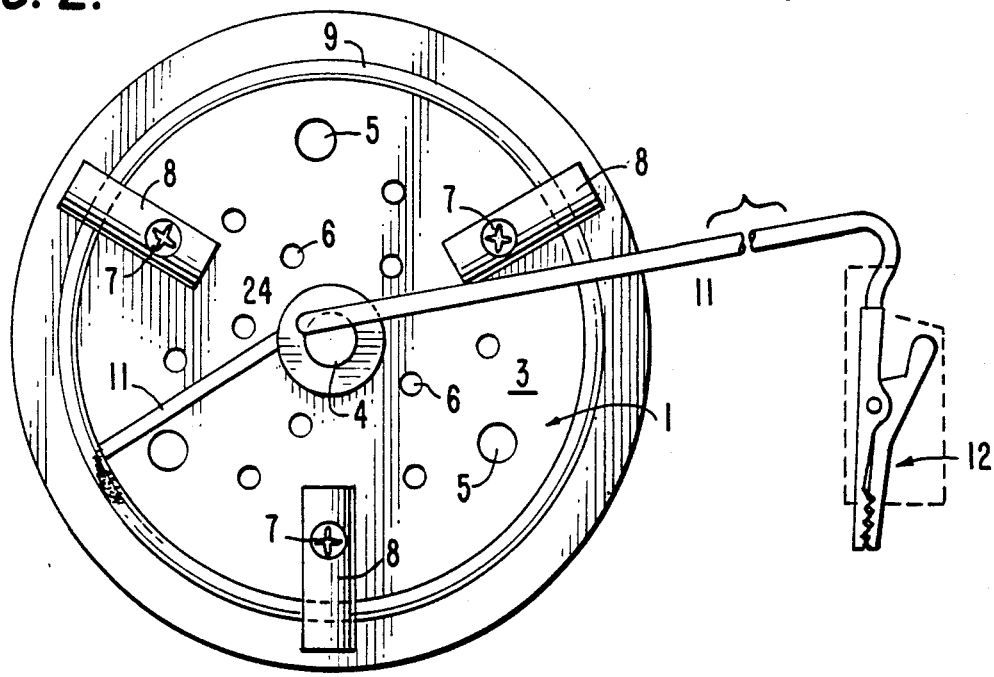
FIG. 2 is a plan view of the invention as shown in FIG. 1 with the schematic excluded, but also showing an attaching means in the form of a clip.

As can be seen in FIG. 1 the apparatus 20 of the invention is shown connected to an electrical source. Before discussing the device independently of the electrical source, it may be helpful to explain its use in conjunction with an electrified fence. As shown in FIG. 1, a portion of what is depicted there has a schematic of an electrified fence. The fence itself is shown by line 13 connected by a lead wire 15 to an electrical fence unit or power source 16. Power source 16 in turn is connected by ground wire 17 to an eight (8) foot ground rod 18. The fence 13 is connected between electric fence insulators 14 in turn are connected to an electric fence post 14A typically made of steel. It is to this electrical fence 13 that the apparatus as shown in elevation in FIG. 1 is attached to provide the electrical source.

As can be seen in FIG. 1 the apparatus 20 includes a circular metal plate 1 which is referred to herein as a grounded charge plate which is about 4½ inches in diameter. In the center of charge plate 1 is provided a center hole 2 of about 5/16ths of an inch diameter through which threaded rod 4 extends and is fixed to the plate by two (2) lock nuts 3 and 3A threadedly engaged with the threaded rod on either side of the plate 3 and 3A as can be seen. Rod 4 itself is about 7 inches long and 5/16th inch in diameter. The portion of the rod 4 distal from the plate is conical in shape to facilitate insertion of the rod into the anthill.

To the top of the rod extending from the face opposite from the side from which the threaded rod extends is secured an insulated handle 22 which is arranged fixed to the threaded rod 4 concentric with the axis of the rod itself. Handle 22 is hollow throughout its entire length to receive at least a portion of rod 4. Handle 22 has a hole 24 in its top and a hole 26 in the side adjacent the bottom to facilitate passage of an insulated wire through passage 28. A circular rod referred to herein as a charge ring 9 is arranged in a closed circle concentric with center hole 2 in plate 1 and located adjacent the periphery of the plate 1. The ring 9 is spaced inwardly from the periphery of plate 1 but is substantially closer to the periphery than the center hole 2.

Ring 9 is also spaced from the plate sufficiently to be insulated from plate 1 when there is no conductors therebetween to short circuit these elements. In this particular embodiment the spacing is about ⅛th of an inch and is substantially constant about the entire circumference of the charge ring 9 to maintain the spacing and otherwise insulate the ring 9 from plate 1, three (3) insulators 8 are fixed to the ring 9 and spaced equidistantly from one another about the circumference of plate 1. Insulators 8 are, in this preferred embodiment, plastic tubing having a length of about 1 inch and ⅜th inch diameter. A hole is cut into the plastic tubing to receive the ring 9 in such a way that it is spaced about ⅛th of an inch from charge plate 1. The plastic tubing itself is fixed to portions of the plate between the center 2 and ring 9 by metal screws 7. With the insulators 8 secured to the plate 1 in this manner, charge ring 9 is fixed in place to maintain the desired spacing throughout its entire circumference.

The insulated wire 11 has one end extending through the passage 28 of the handle 22, hole 26 adjacent the bottom of the handle 22 and is electrically connected to charge ring 9 as indicated. The other end is fixed to an insulated lead wire clip 12. The clip is electrically conductive and configured to enable the lead wire 11 to be attached to electrified fence 13. Although a metal clip is shown, any other attaching means may be used so long as it can be releasably secured to the fence and conduct a sufficient current to kill the insects.

It should also be noted that the plate has a number of holes throughout its surface. These holes vary in diameter and it is a specific embodiment, the larger holes are 5/16th of an inch and the smaller holes are ⅛th of an inch in diameter. These additional holes facilitate access for the ants or other insects when the device is used.

In operation, typically a number of the devices would be used in the vicinity of anthills or other large congregations of insects. When it is used with ants, the probe or rod 4 is extended into the mound and the distal end of the lead wire 11 with the clip 12 is secured to electrified fence 13. Once the probe is extended into the mound, the ants will start covering the unit, because they want to attack the foreign object in order to protect the anthill. In doing so the ants will crawl between the charge ring 9 and the grounded charge plate 1, short circuiting them and thereby causing an electrical current to jump from the charging ring through their body to the grounded plate 1. This, of course, electrocutes them. It is the nature of the other ants to try and help those that have been killed. In doing so, they will follow those who have preceded them and pass through the space between the charge ring 9 and the grounded plate 1. In this way, as more and more ants return to rescue those which have already been electrocuted, they also will be electrocuted. It has been found that on a typical mound, the entire anthill can be destroyed within about one hour.

By employing insulated clip 12, the unit can be plugged anywhere on an existing fence. Once the unit has completed the task, the clip 12 simply can be removed with the unit 20 moved to another portion on the fence where anthills can be found.

What is claimed is:

1. An apparatus for electrocuting insects comprising:
   a. a flat plate and an insertion shaft for securing the plate to ground and providing an electrical contact to ground;
   b. a rod located adjacent to the perimeter of said plate in the form of a closed ring concentric with the plate center, said rod being displaced from said plate sufficiently to permit an insect to pass therebetween, a means for electrically connecting said rod to an electrical source;
   c. said rod and said plate cooperating to deliver an electrical charge sufficient to kill an insect passing therebetween;
   d. an elongated handle, made of insulated material to protect the user, extending from a side of said plate opposite said shaft, wherein said handle and said shaft have a common longitudinal axis and said axis is perpendicular to said plate; and
   e. said means for electrically connecting said rod to said source includes a wire having one end electrically connected to said rod, said wire passing through at least a portion of said handle.

2. The apparatus according to claim 1 wherein said first member is a plate and second second member is a rod circumscribing the effective center of said plate and spaced therefrom substantially equidistantly throughout the entire length of said rod.

3. The apparatus according to claim 1 wherein said plate is circular in configuration and said rod forms a closed ring concentric with the perimeter and located intermediate the plate center and the plate perimeter.

4. The apparatus according to claim 1 wherein said plate includes a number of holes to facilite access for the insects when the plate is located on the ground.

5. The apparatus according to claim 4 wherein insulating means are secured to said rod and fixed to said plate for holding said rod in spaced relationship to said plate.

6. The apparatus according to claim 5 wherein said insulating means includes plastic tubing, said tubing having one end fixed to said plate and another end with a hole therethrough for receiving said rod to insulate said rod from said plate.

7. The apparatus according to claim 6 wherein said handle is made from insulated material to protect the user when placing the apparatus in the ground in the area where insects are to be killed.

8. The apparatus according to claim 7 wherein said means for electrically connecting said rod to an electrical source includes an insulated wire extending through the top of said handle means, said handle means having a passage therethrough and a hole in the bottom of said handle for receiving said insulated wire, said insulated wire extending through said passage portion and through a hole in the bottom of said handle and it being electrically connected to said rod.

9. The apparatus according to claim 8 wherein said elongated shaft is about seven inches long and made of metal.

10. The apparatus according to claim 9 wherein said means for electrically connecting said rod to said electrical source includes means to connect said rod to an electrified fence including a clip made of an electrically conducting material.

11. The apparatus according to claim 10 wherein said elongated rod is a threaded rod having a conical end at its distal end to facilitate insertion into the earth, the proximate end being secured to said plate by lock nuts.

* * * * *